US008895852B2

(12) United States Patent
Sella et al.

(10) Patent No.: US 8,895,852 B2
(45) Date of Patent: Nov. 25, 2014

(54) JUNCTION BOX FOR SNAP TOGETHER ELECTRICAL CONNECTIONS TO PHOTOVOLTAIC PANELS

(75) Inventors: Guy Sella, Beit Aharon (IL); Leon Kupershmidt, Rishon LeZion (JM)

(73) Assignee: Solaredge Technologies Ltd., Hod Hasharon (IL)

( * ) Notice: Subject to any disclaimer, the term of this patent is extended or adjusted under 35 U.S.C. 154(b) by 207 days.

(21) Appl. No.: 13/462,359

(22) Filed: May 2, 2012

(65) Prior Publication Data

US 2012/0279747 A1 Nov. 8, 2012

(30) Foreign Application Priority Data

May 2, 2011 (GB) .................................. 1107241.0

(51) Int. Cl.
*H02G 3/08* (2006.01)
*H05K 5/00* (2006.01)
*H02G 3/16* (2006.01)

(52) U.S. Cl.
CPC . *H02G 3/16* (2013.01); *H02G 3/083* (2013.01)
USPC .............. 174/50; 174/520; 174/59; 361/600; 361/679.01

(58) Field of Classification Search
USPC .............. 174/50, 520, 59, 559, 53, 17 R, 60, 174/138 F; 220/3.2, 3.3, 4.02; 361/600, 601, 361/679.01, 724, 717, 752, 730, 796; 439/76.1, 76.2, 949, 709, 816; 29/863, 29/825, 592.1; 136/251
See application file for complete search history.

(56) References Cited

U.S. PATENT DOCUMENTS

| 4,460,232 | A  | * | 7/1984  | Sotolongo ...................... 439/535 |
| 6,344,612 | B1 | * | 2/2002  | Kuwahara et al. .............. 174/50 |
| 7,291,036 | B1 | * | 11/2007 | Daily et al. ................... 439/76.1 |
| 7,763,807 | B2 | * | 7/2010  | Richter ....................... 174/138 F |
| 7,914,298 | B2 | * | 3/2011  | Lauermann et al. .......... 439/76.1 |
| 7,960,650 | B2 |   | 6/2011  | Richter et al. |
| 8,040,678 | B2 | * | 10/2011 | Tai et al. ....................... 361/752 |

(Continued)

FOREIGN PATENT DOCUMENTS

| CN | 201008026 Y   | 1/2008 |
| DE | 202009001918 U | 7/2009 |

(Continued)

OTHER PUBLICATIONS

Combined Search and Examination Report under Sections 17 and 18(3) in GB1107241.0 dated Sep. 5, 2011.

(Continued)

*Primary Examiner* — Angel R Estrada
(74) *Attorney, Agent, or Firm* — Banner & Witcoff, Ltd.

(57) ABSTRACT

A junction box adapted to provide an electrical connection to an electrical wire attached to a photovoltaic panel. The junction box has a lower portion which has an entry slot to allow entry of the wire into the junction box and a raised protrusion over which the wire is bent and formed to be substantially in the same shape as the raised protrusion. The junction box also has a clamp adapted to be attachable to said lower portion, whereby the clamp holds the wire in place for providing the electrical connection. The wire is preferably bus ribbon. The lower portion preferably has an elastic polymeric element disposed between the raised portion and the wire. The raised protrusion may have an elastic polymeric element.

20 Claims, 12 Drawing Sheets

(56) References Cited

U.S. PATENT DOCUMENTS

| | | | |
|---|---|---|---|
| 8,097,818 B2 * | 1/2012 | Gerull et al. | 174/59 |
| 8,113,853 B2 * | 2/2012 | Coyle et al. | 439/76.1 |
| 8,248,804 B2 * | 8/2012 | Han et al. | 361/717 |
| 8,476,539 B2 * | 7/2013 | Ilchev | 174/520 |
| 8,500,462 B2 * | 8/2013 | Mills et al. | 439/76.1 |

FOREIGN PATENT DOCUMENTS

| | | |
|---|---|---|
| DE | 102008022049 A1 | 11/2009 |
| EP | 0999601 A1 | 5/2000 |
| EP | 1729369 | 12/2006 |
| EP | 2296188 | 3/2011 |
| EP | 2296189 A1 | 3/2011 |
| JP | 2006165017 A | 6/2006 |
| WO | 2008057493 | 5/2008 |
| WO | 2009/076740 A1 | 6/2009 |

OTHER PUBLICATIONS

Extended European Search Report—EP12166422.1—Mailing date: Aug. 27, 2014.

* cited by examiner

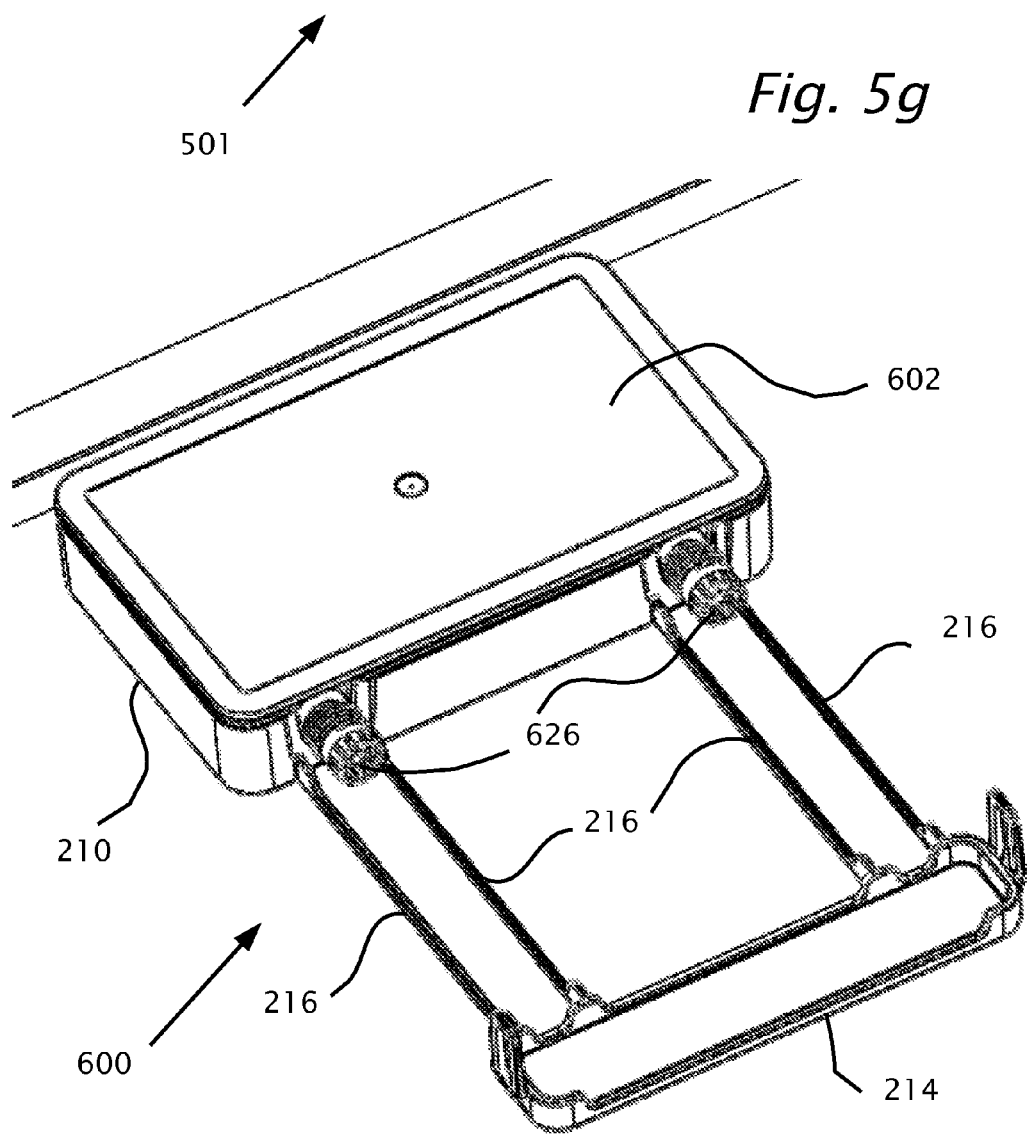

JUNCTION BOX FOR SNAP TOGETHER ELECTRICAL CONNECTIONS TO PHOTOVOLTAIC PANELS

BACKGROUND

1. Technical Field

The present invention relates to electrical connections to photovoltaic panels and more particularly to a junction box with upper and lower portions which snap together to achieve the electrical connection.

2. Description of Related Art

A photovoltaic module or photovoltaic panel is a packaged interconnected assembly of photovoltaic cells, also known as solar cells. Since a single photovoltaic module can only produce a limited amount of power, commercial installations include several modules or panels interconnected in serial and in parallel into a photovoltaic array. Electrical connections are made in series to achieve a desired output voltage and/or in parallel to provide a desired amount of current source capability. A photovoltaic installation typically includes the array of photovoltaic modules, an inverter, batteries and interconnection wiring. Electronic modules may be integrated with the photovoltaic modules which perform electrical conversion, e.g. direct current (DC) to direct current conversion, electrical inversion, e.g. micro-inverter, or other functions such as monitoring of performance and/or protection against theft.

Bus ribbon is a common interconnect that is used to connect photovoltaic modules. Bus ribbon is made up of a copper ribbon, or flat wire, that is coated in solder. The solder protects the surface of the copper from oxidation and provides a layer of solder to form the solder joint. Bus ribbon is generally 5 mm-6 mm wide, although some applications require bus ribbon to be more than twice as wide. Bus ribbon may serve as an input/output to a conventional junction box typically mounted on the back side of the photovoltaic module.

When part of a photovoltaic module is shaded, the shaded cells do not produce as much current as the unshaded cells. Since photovoltaic cells are connected in series, the same amount of current must flow through every serially connected cell. The unshaded cells force the shaded cells to pass more current. The only way the shaded cells can operate at a higher current is to operate in a region of negative voltage that is to cause a net voltage loss to the system. The current times this negative voltage gives the negative power produced by the shaded cells. The shaded cells dissipate power as heat and cause "hot spots". Bypass diodes are therefore integrated with the photovoltaic modules to avoid overheating of cells in case of partial shading of the photovoltaic module.

Blocking diodes may be placed in series with cells or modules to block reverse leakage current backwards through the modules such as to block reverse flow of current from a battery through the module at night or to block reverse flow down damaged modules from parallel-connected modules during the day.

The term "wire" or "electrical wire" as used herein is a piece of metal or other electrically conductive material of any cross-sectional shape used for carrying electrical currents or signals. Bus ribbon is an example of an electrical wire used to electrically connect to photovoltaic panels.

The term "cable gland" as used herein refers to a device used for the entry of electrical cables or cords into electrical equipment and is used to firmly secure an electrical cable entering a piece of electrical equipment.

BRIEF SUMMARY

According to embodiments of the present invention there is provided a junction box adapted to provide an electrical connection to an electrical wire attached to a photovoltaic panel. The junction box has a lower portion which has an entry slot to allow entry of the wire into the junction box and a raised protrusion over which the wire is bent and formed to be substantially in the same shape as the raised protrusion. The junction box may have a clamp attachable to the lower portion. The clamp holds the wire in place for providing the electrical connection. The wire is typically bus ribbon. The lower portion may have an elastic polymeric element disposed between the raised protrusion and the wire and or the raised protrusion may have an elastic polymeric element.

The junction box may have an upper portion including a terminal. The terminal connects to an electrical load. The terminal is adapted to be applied under pressure onto the wire, thereby conforming the terminal to be of substantially the same shape as the raised protrusion. The upper portion typically has a fastener which closes the upper portion to the lower portion under pressure. The terminal is typically spring loaded. The electrical load may be a direct current (DC) to DC converter, a DC to alternating current (AC) inverter, a DC motor or a battery. The upper portion preferably has a seal which is positioned between the upper and the lower portions. The seal is adapted to seal under the same pressure which effects the electrical connection between the terminal and the wire. The upper portion typically includes a diode connected to the terminal. The diode may be either a bypass diode or a blocking diode. The upper portion may be an electronic module connected to the terminal. The upper portion preferably has a cable gland.

According to embodiments of the present invention there is provided a method to provide a connection to a photovoltaic panel. A wire, e.g. bus ribbon, which connects electrical to the photovoltaic panel is passed through an entry slot of a lower portion of a junction box. The bus ribbon is bent over a raised protrusion provided in the lower portion of the junction box. The bus ribbon is formed to be substantially the same shape as the raised protrusion. The bus ribbon is typically clamped onto the protrusion of the lower portion of the junction box. An upper portion of the junction box is inserted into the lower portion of the junction box and while inserting a terminal is loaded compressively onto the bus ribbon. The compressive loading may include spring loading. Additionally while inserting, the upper portion is sealed to the lower portion of the junction box. The terminal is typically conformed to the shape of the protrusion while electrically connecting to the bus ribbon between the terminal and the protrusion. An elastic polymeric material is typically inserted between the protrusion and the wire.

BRIEF DESCRIPTION OF THE DRAWINGS

The invention is herein described, by way of example only, with reference to the accompanying drawings, wherein:

FIG. 5g shows a method according to an embodiment of the present invention.

FIGS. 6a and 6b show an upper junction box assembly inserted into a lower junction box assembly according to another embodiment of the present invention.

DETAILED DESCRIPTION

Figure 1:
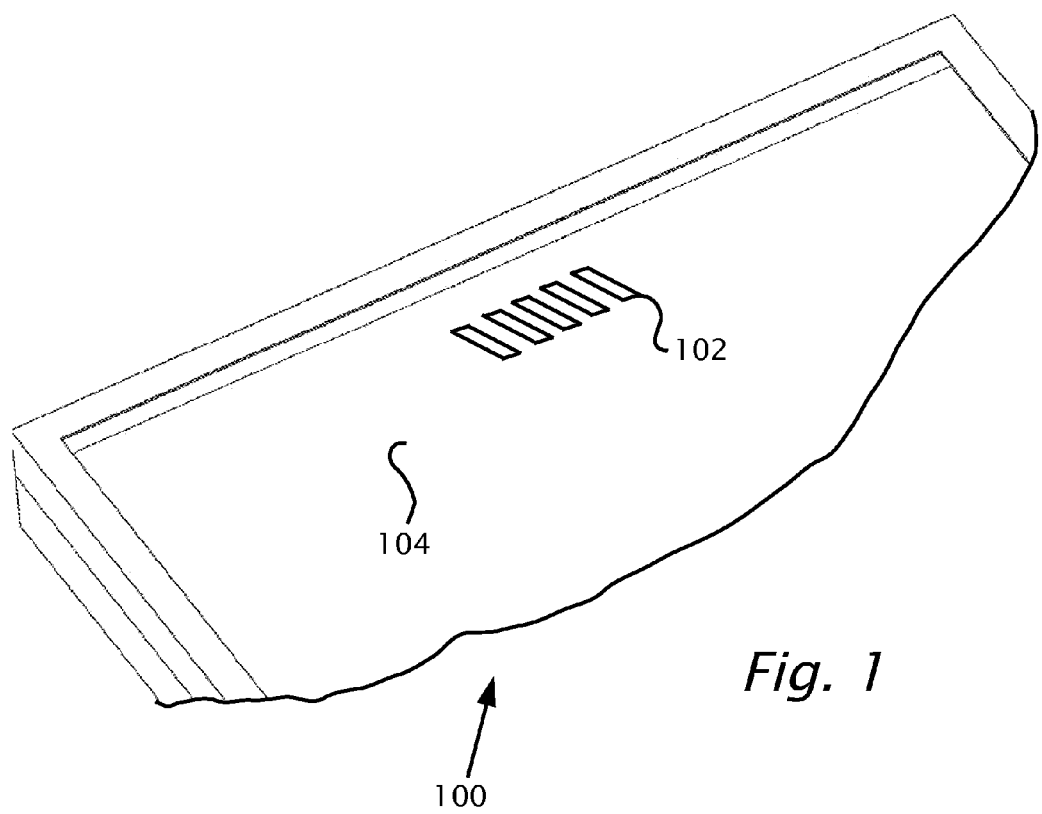
FIG. 1 shows a partial view of the back side (i.e. non photovoltaic side) of a photovoltaic panel according to an embodiment of the present invention.

Reference will now be made in detail to embodiments of the present invention, examples of which are illustrated in the accompanying drawings, wherein like reference numerals refer to the like elements throughout. The embodiments are described below to explain the present invention by referring to the figures.

Before explaining embodiments of the invention in detail, it is to be understood that the invention is not limited in its application to the details of design and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

By way of introduction, embodiments of the present invention are directed to enable an interconnection of photovoltaic panels with cables and/or photovoltaic panels with electronic modules such as alternating current (AC) inverters or direct current (DC) to DC converters with a minimal use of hand tools while providing electrical isolation and hermeticity.

Reference is now made to the drawings. FIG. 1 shows a partial view of the back side 104 (i.e. non photovoltaic side) of a photovoltaic panel 100 according to an embodiment of the present invention. bus ribbons are 102 located on back side 104 of panel 100 and provide electrical connections to internal photovoltaic cells of panel 100.

Figure 2:
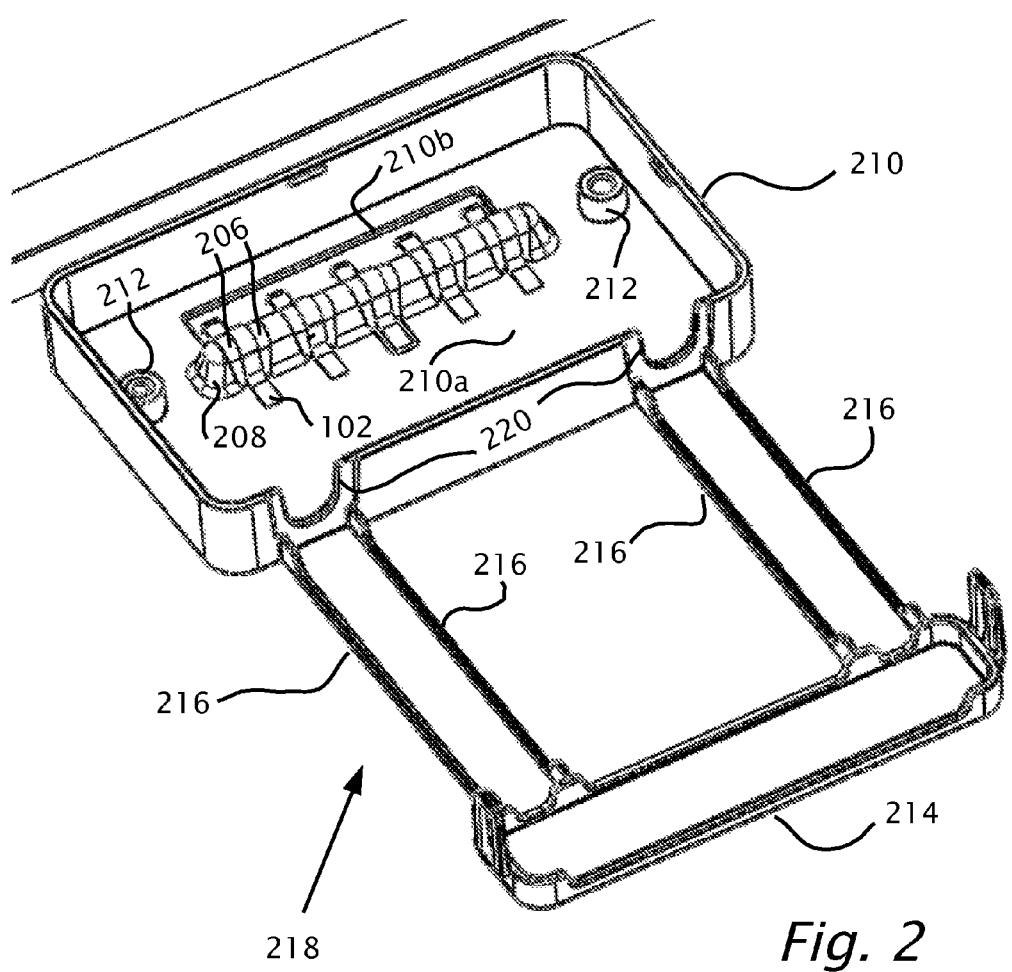
FIG. 2 shows a lower half of a junction box assembly according to an embodiment of the present invention.

Reference is now made to FIG. 2 which shows a lower half of a junction box assembly 218 according to an embodiment of the present invention. Assembly 218 is typically attached to back side 104 of panel 100 at the time of manufacture/assembly of panel 100. Assembly 218 may be made or cast as one piece, in the form of a plastic injection molding. Assembly 218 has support rails 216, retainer clip 214 and lower part 210 of junction box.

Figure 5A:
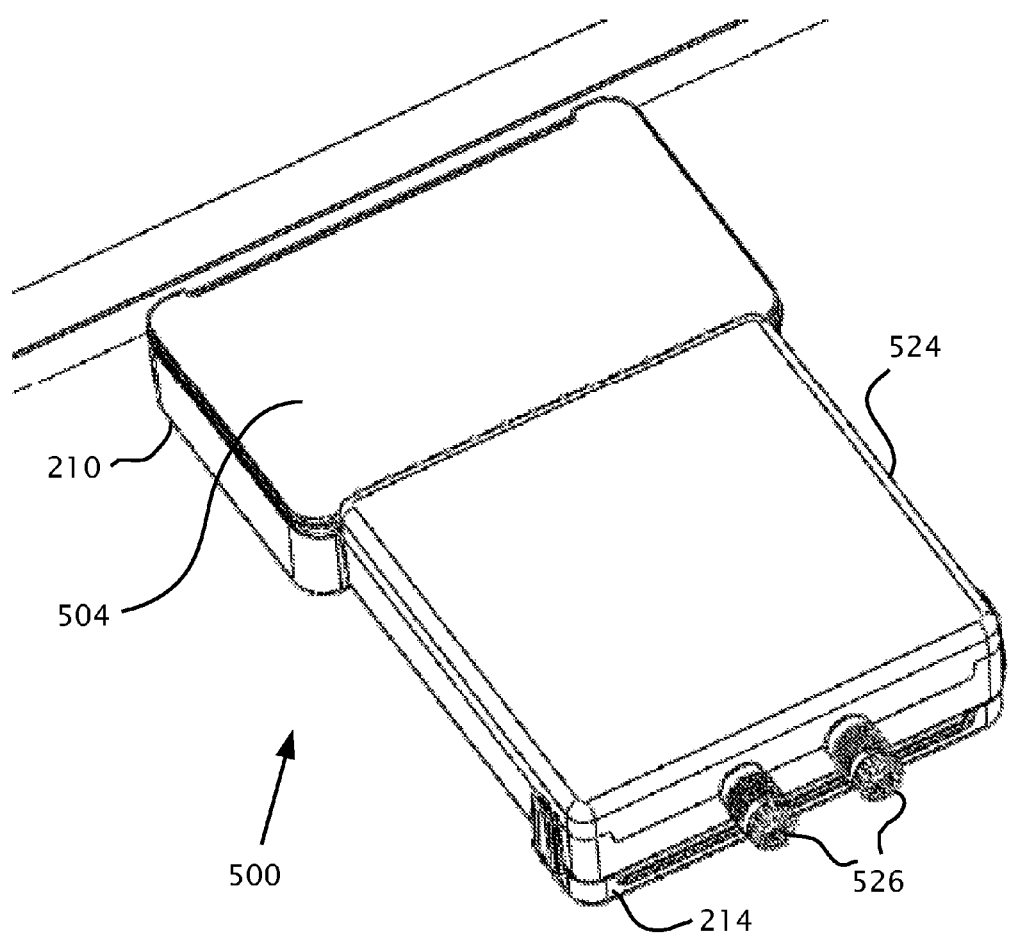
FIGS. 5a and 5b show isometric views of upper an junction box assembly connected/inserted into a lower junction box assembly according to an embodiment of the present invention.
Figure 5B:
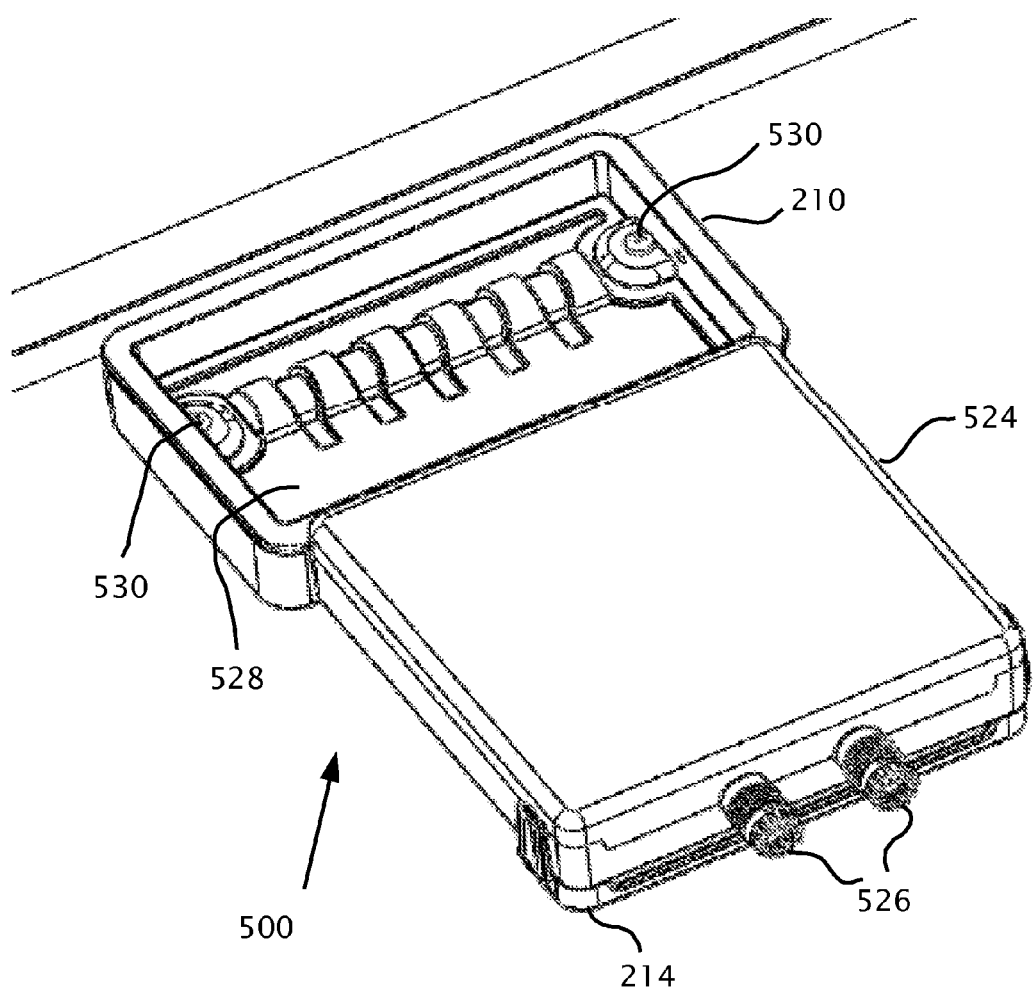

Reference is now also made to FIGS. 5a and 5b which shows isometric views of upper junction box assembly 500 connected/inserted into lower junction box assembly 218 according to an embodiment of the present invention. Assembly 500 has a lid 504 which when removed shows an upper terminal assembly 528 fixed into lower assembly 218 using screws 530. Upper terminal assembly 528 after being inserted into lower assembly 218 provides complete electrical isolation of the electrical connection of upper assembly 528 with the lower assembly 218. Lid 504 provides a cosmetic appearance and/or further level of isolation. Attached mechanically and electrically to upper terminal assembly 528 is electronic module 524. Electronic module 524 is attached mechanically to panel 100 using support rails 216 and retainer clip 214. Electronic module 524 has cable glands 526 which allow a cable entry into electronic module 524 where the cable may be terminated inside electronic module 524.

Referring back to FIG. 2, support rails 216 may be made from one piece of plastic as part of an injection molding process or as separate parts. Support rails 216 may be made from spring metal which may be plastic coated. Support rails 216 provide the correct distance between module 524 and backside 104 of panel 100. Support rails 216 also provide support for module 524 along with retainer clip 214. Retainer clip 214 may also be made from spring metal which may be plastic coated or made from one piece of plastic as part of an injection molding process.

Figure 3A:
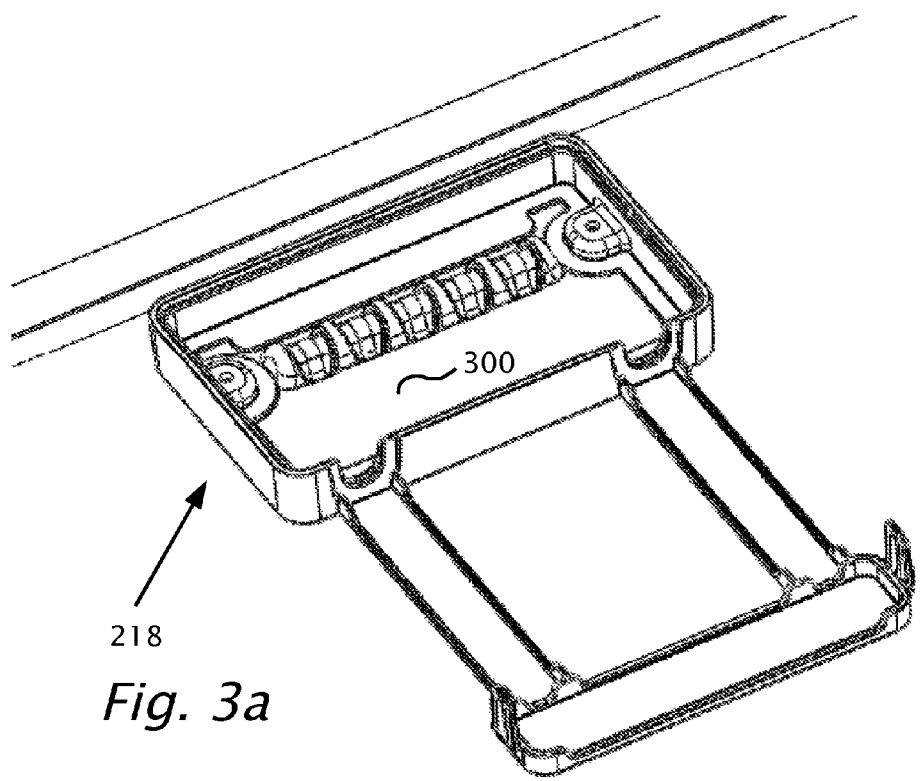
FIG. 3a which shows a junction box assembly with clamp according to an embodiment of the present invention.

Reference is now also made to FIG. 3a which shows junction box assembly 218 with clamp 300 according to an embodiment of the present invention. Clamp 300 is preferably attached to the bottom side 210a of junction box 210 with an adhesive, by screws through hole pillars 212 or by the insertion of upper junction box assembly 500 (FIG. 5b) and the tightening of screws 530 into threaded pillars 212.

Referring back to FIG. 2, junction box 210 has gland apertures 220 to accommodate embodiment 600 and through hole pillars 212. Through hole pillars 212 are typically used to attach junction box 210 to backside 104 of panel 100. Through hole pillars 212 may also be used to attach clamp plate 300 to the bottom side 210a of junction box 210.

Junction box 210 has a slot 210b where bus ribbons 102 are passed through and are placed into the inside of junction box 210. Bus ribbons 102 are typically bent and formed over raised protrusion 208. Raised protrusion 208 may have additionally a rubber or elastic material 206 placed in-between protrusion 208 and bus ribbon 102.

Figure 3B:
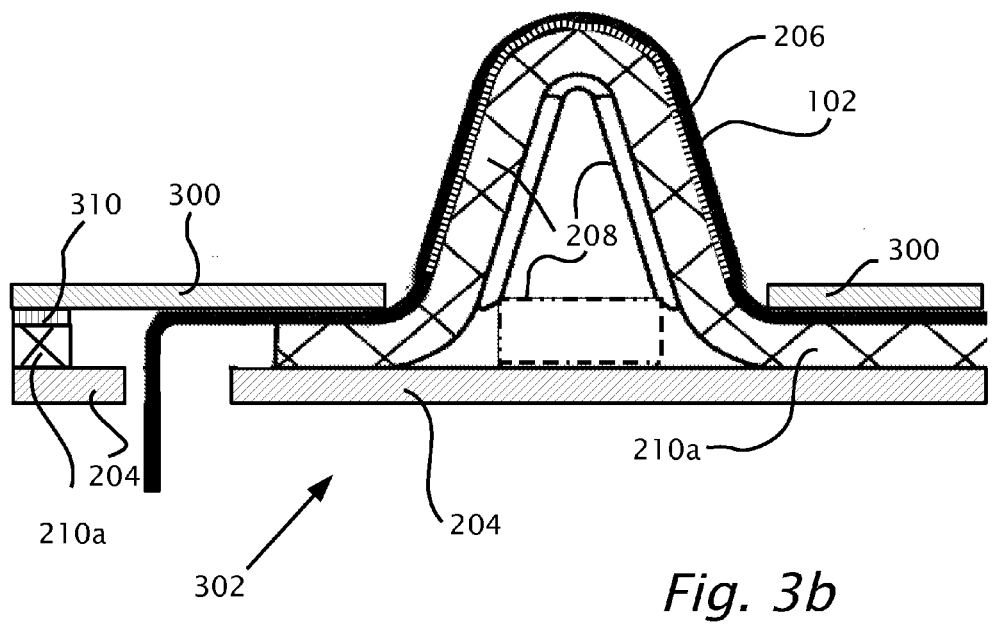
FIG. 3b shows a partial cross sectional view of a wire ribbon mounted in a lower junction box assembly with a clamp according to an embodiment of the present invention.

Reference is now made to FIG. 3b which shows a partial cross sectional view 302 of wire ribbon 102 mounted in lower junction box assembly 218 with clamp 300 according to an embodiment of the present invention. Cross sectional view 302 shows bus ribbon 102 clamped by clamp 300 over elastic material 206 and protrusion 208. One of two gaskets 310 (for example an "O" ring), is shown between bottom side 210a of junction box 210 and clamp 300. Gasket 310 provides a level of sealing against the ingress of water and/or dust into panel 100. Additionally the underside of clamp 300 may be coated with an elastic material to provide sealing between the elastic material and bus ribbon 102. bus ribbon 102 passes through slot 210b of junction box 210. bus ribbon 102 continues through a hole in backside 204 of solar panel 100 and is connected to the photovoltaic cells inside panel 100. Protrusion 208 is typically formed by an indentation on bottom side 210a of junction box 210. Bottom side 210a of junction box 210 is located and may be attached on backside 204 of solar panel 100.

Figure 4:
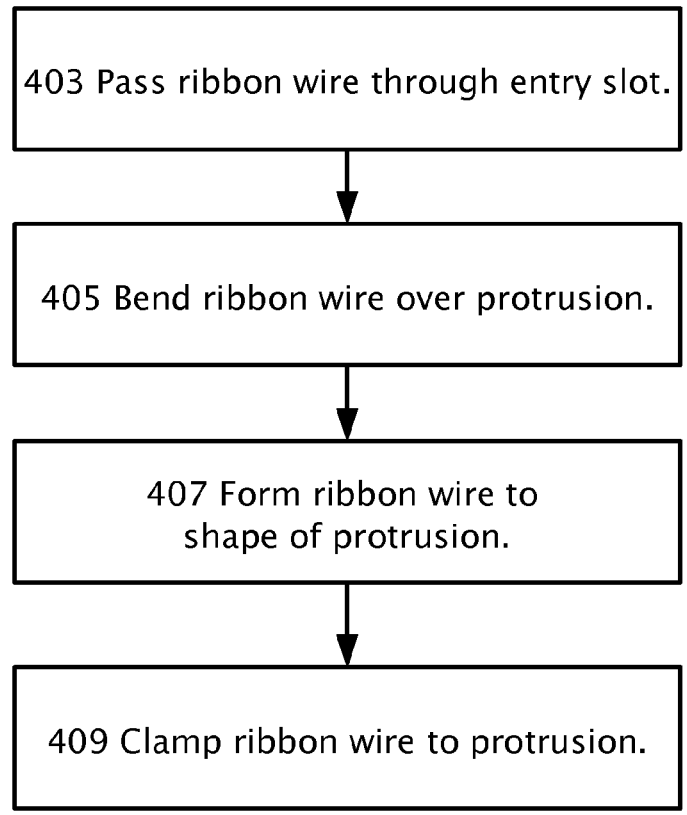
FIG. 4 shows a method according to an embodiment of the present invention.

Reference is now made to FIG. 4 which shows a method 401 according to an embodiment of the present invention. Typically, assembly 218 is attached to backside 104 of panel 100 at the time of manufacture/assembly of panel 100 whilst ensuring bus ribbon 102 is passed through entry slot 210b of junction box 210 (step 403). With bus ribbon 102 located inside junction box 210 as a result of step 403, bus ribbon 102 is bent over elasticated material 206 and protrusion 208 (step 405). After being bent, bus ribbon is then formed (step 407) to take substantially the shape of protrusion 208 and/or elasticated material 206. The bending (step 405) and forming (step 407) of bus ribbon 102 is then held firm and clamped into place (step 409) in junction box 210 using clamping plate 300. Clamp 300 is preferably attached to the bottom side 210a of junction box 210 with an adhesive, by screws through hole pillars 212 or by the insertion of upper junction box assemblies 500 and 600 (not shown) and the tightening of screws 530

Figure 5C:
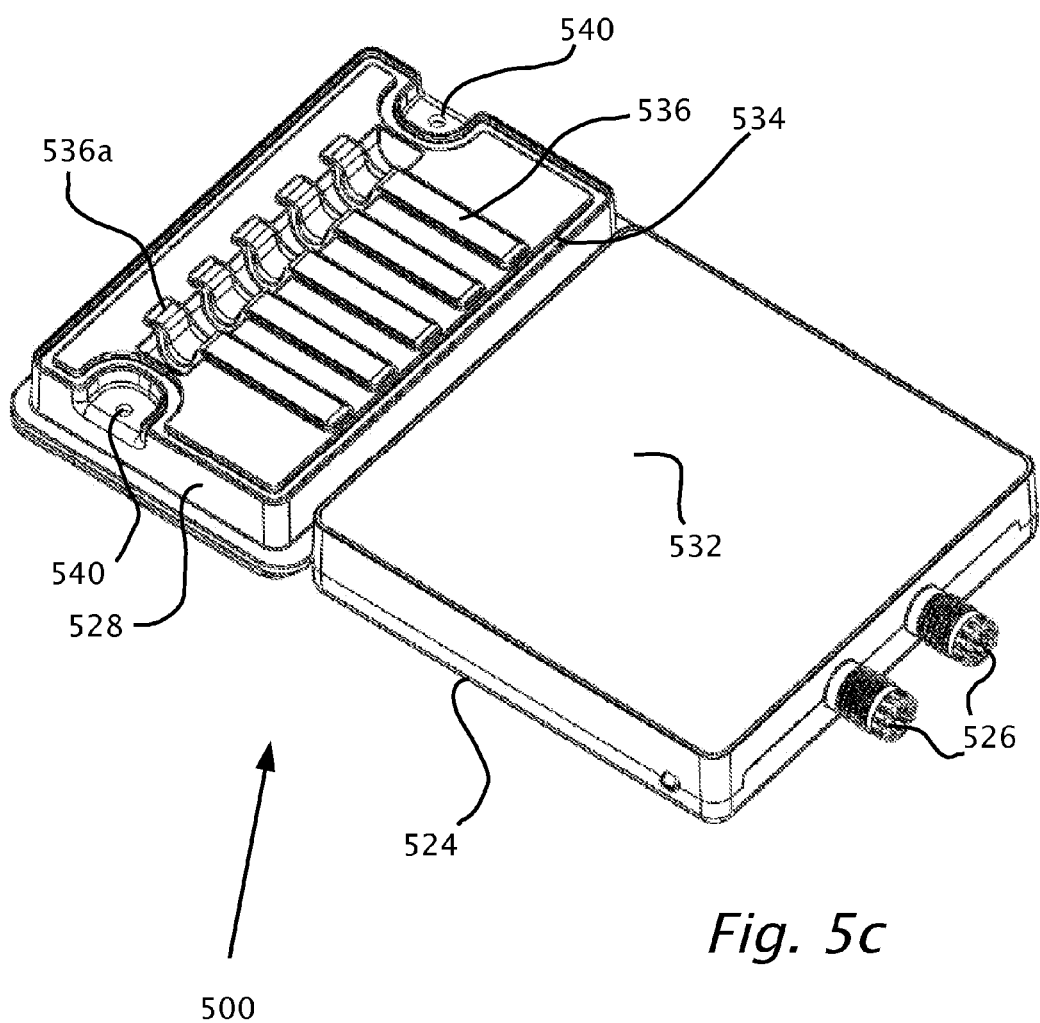
FIGS. 5c and 5d show isometric views of the underside of an upper junction box assembly according to an embodiment of the present invention.
Figure 5D:
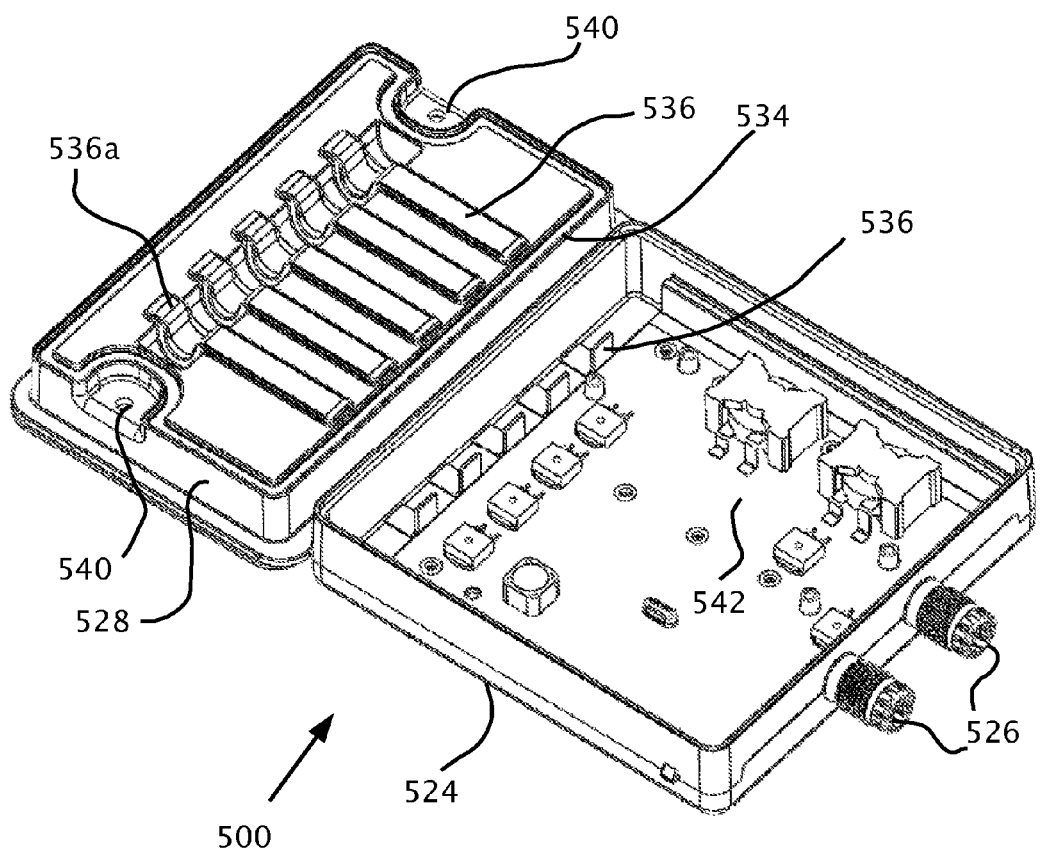

Reference is now made to FIGS. 5c and 5d which show isometric views of the underside of upper junction box assembly 500 according to an embodiment of the present invention. Upper junction box assembly 500 has electronic module 524 with lid 532, when lid 532 is removed the component side of electronic circuit board 542 is shown. Circuit board 542 is typically a direct current (DC) to DC converter or a DC to alternating current (AC) inverter. Termination of interconnecting cables on circuit board 542 is provided by insertion of interconnecting cables into cable entry glands 526. Upper terminal assembly 528 has mounting through holes 540 which along with screws 530 (not shown) are used as part of the insertion and retention of assembly 500 into lower junction box assembly 218. Upper terminal assembly 528 also has terminals 536 which provide an electrical connection between circuit board 542 and the curved portions 536a of terminals 536. An indented portion of assembly 528 houses curved portions 536a of terminals 536 and typically there may be an elastic material placed between assembly 528 and curved portions 536a. Sufficient flexibility and movement of curved portions 536a typically allows curved portions 536a to conform around the bent and formed portion wire ribbon 102 when upper junction box assembly 500 inserted into lower junction box assembly 218.

Figure 5E:
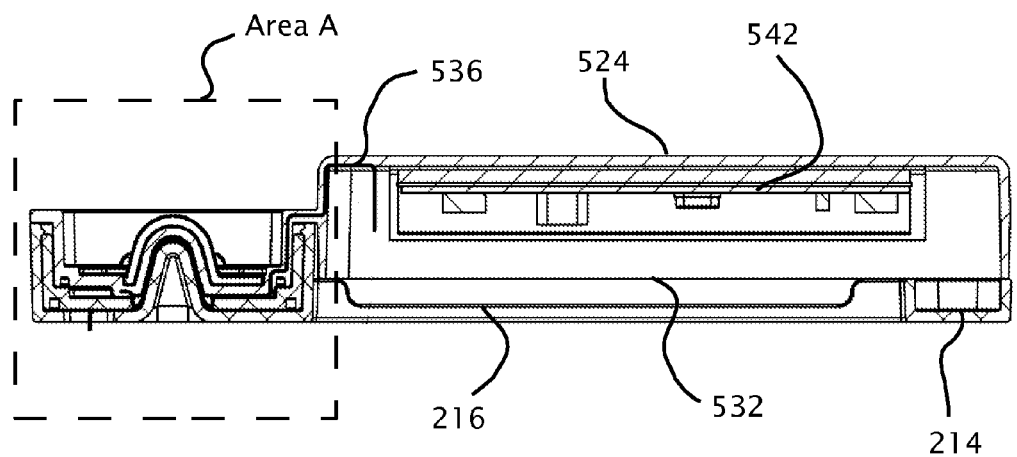
FIG. 5e shows a cross section view of an upper junction box assembly inserted into a lower junction box assembly according to an embodiment of the present invention.

Reference is now made to FIG. 5e which shows a cross section view of upper junction box assembly 500 inserted into lower junction box assembly 218 according to an embodiment of the present invention. Area A shows an electrical connection between upper junction box assembly 500 inserted into lower junction box assembly 218. Upper junction box assembly 500 includes further; electronic module 524 with lid 532 and electronic circuit board 542. Lid 532 rests and is held by support rails 216 along with module 524 held by retainer clip 214. Terminal 536 provides the electrical connection between circuit board 542 and connection to photovoltaic cells in panel 100 (not shown) via the electrical connection between upper assembly 500 inserted into lower assembly 218.

Figure 5F:
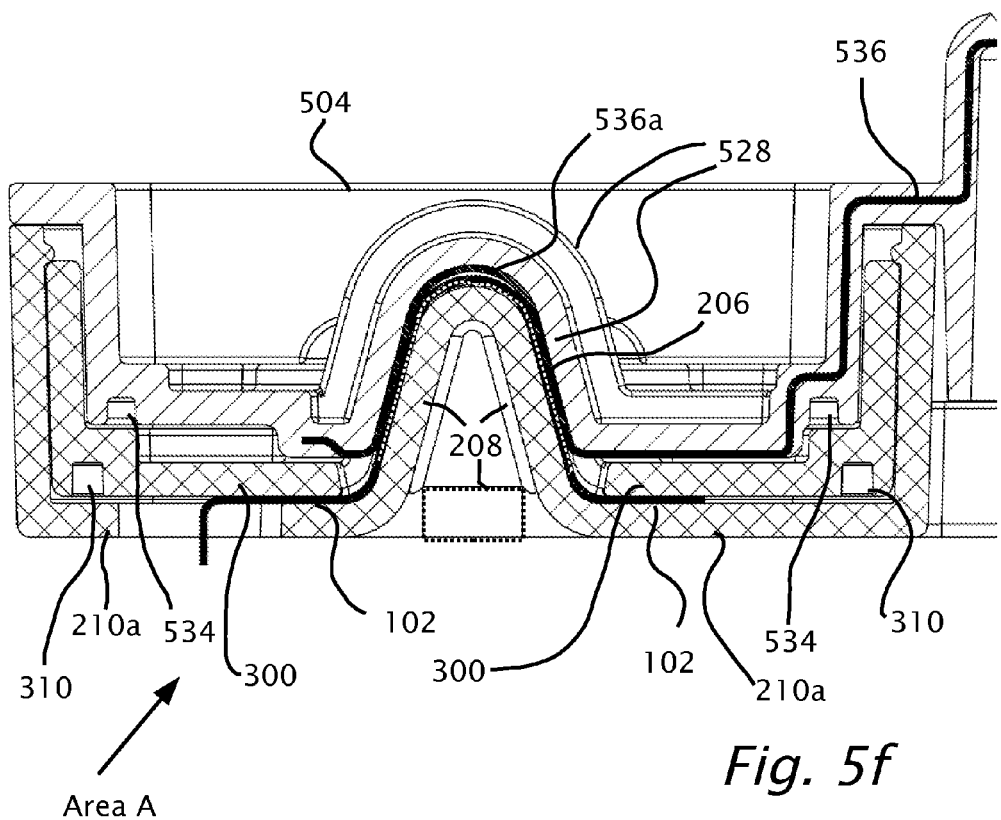
FIG. 5f shows area A shown in FIG. 5e in greater detail according to an embodiment of the present invention.

Reference is now made to FIG. 5f and FIG. 5g which show area A shown in FIG. 5e in greater detail and a method 501 respectively according to an embodiment of the present invention. Area A shows details of the insertion (step 505) of upper junction box assembly 500 inserted into lower junction box assembly 218 to form an electrical connection between circuit board 542 and connection to photovoltaic cells in panel 100 (not shown). The electrical connection is formed between curved portion 536a which may be spring loaded and bus ribbon 102. Curved portion 536a is held by assembly 528. Curved portion 536a is connected to circuit board 542 via terminal 536. Sealing of lower assembly 218 is provided by gaskets 310 which provide a level of sealing against the ingression of water and/or dust into aperture 210b by using clamp 300. Sealing between upper assembly 500 and lower assembly 218 is provided by gaskets 534. Further sealing of upper and lower assemblies by lid 504. Protrusion 208 is formed as a part of the bottom side 210a of junction box 210. In between protrusion 208 and bus ribbon 102 is elastic material 206.

Figure 6B:
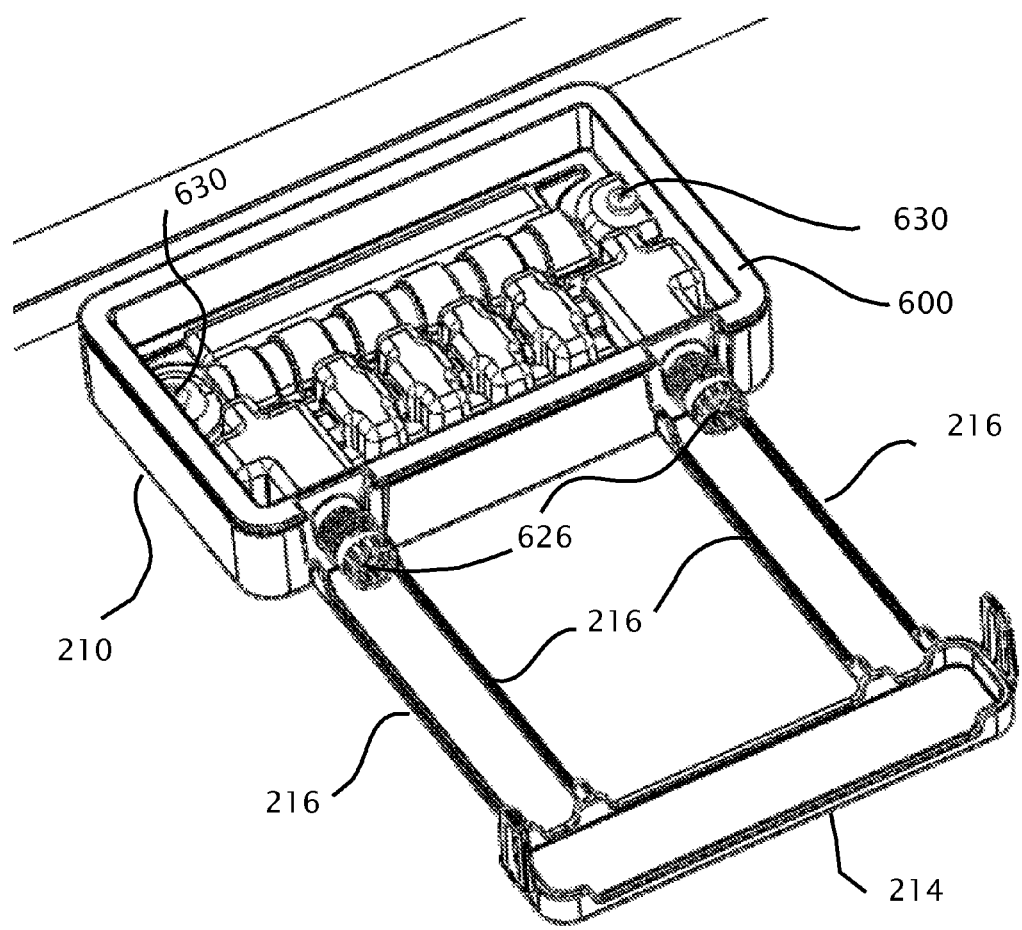

Reference is now made to FIGS. 6a and 6b which show upper junction box assembly 600 inserted into lower junction box assembly 218 according to another embodiment of the present invention. Upper junction box assembly 600 inserted into lower junction box assembly 218 does not make use of support rails 216 and retainer clip 214 only junction box 210 of lower assembly 218. Clamp 300 in junction box 210 is preferably attached to the bottom side 210a of junction box 210 with an adhesive, by screws through hole pillars 212 or by the insertion of upper junction box assembly 600 and the tightening of screws 630 into threaded pillars 212. Upper assembly 600 after being inserted into lower assembly 218 provides complete electrical isolation of the electrical connection of upper assembly 600 with the lower assembly 218. Lid 602 provides a cosmetic appearance and/or further level of electrical isolation and sealing. Assembly 600 has cable glands 626 which allow a cable entry into assembly 600 where the cable may be terminated inside assembly 600.

Figure 6C:
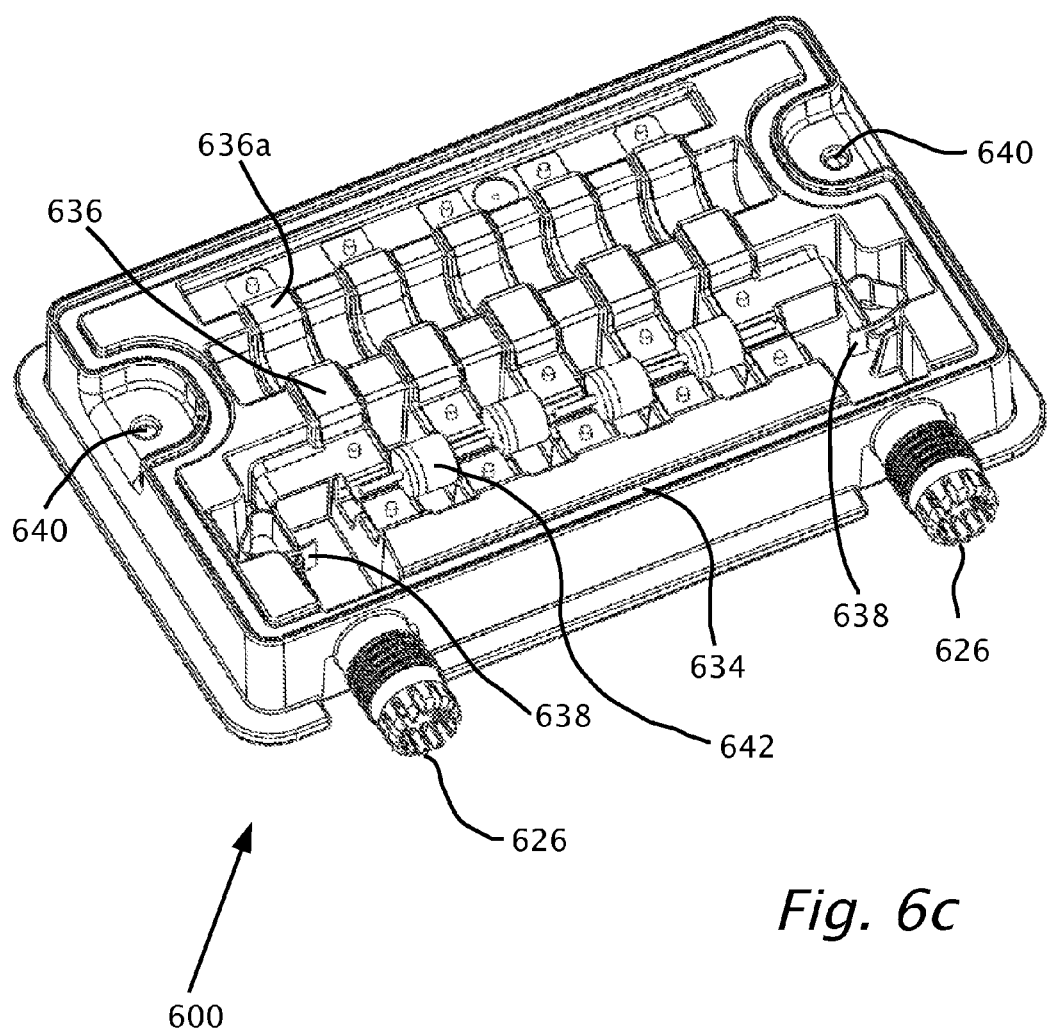
FIG. 6c shows an underside isometric view of an upper assembly according to an embodiment of the present invention.

Reference is now made to FIG. 6c which shows an underside isometric view of upper assembly 600 according to an embodiment of the present invention. Curved portions 636a are typically held by an indented portion of assembly 600. An elastic material may be placed between assembly 600 and curved portions 636a. Sufficient flexibility and movement of curved portions 636a typically allows curved portions 636a to conform around the bent and formed portion of wire ribbon 102 when upper junction box assembly 600 is inserted into lower junction box assembly 218. Curved portions 636a are connected to one end of a bypass diode 642 via terminal 636. Bypass diodes 642 are typically connected between terminals 636. Sealing between upper assembly 600 and lower assembly 218 is provided by gasket 634. Further sealing of upper and lower assemblies may be by lid 602. Upper assembly 600 after being inserted into lower assembly 218 is held in place by screws 630 (not shown) which go through holes 640. Cables are typically passed through and are held by glands 626 and terminated in clamp 638. Clamp 638 is typically spring loaded and is moved by an insertion of a screwdriver to reveal an aperture. The aperture receives an insertion of a conductor provided by a cable which is inserted into gland 626. The removal of the screwdriver causes the aperture to close which clamps the conductor in clamp 638 and a connection of the conductor with terminal 636 is established.

Reference is now made again method 501 shown in FIG. 5g with respect to upper assembly 600 according to an embodiment of the present invention. Upper assembly 600 inserted (step 505) into lower junction box assembly 218 to form an electrical connection between cables terminated in clamp 638 and connection to photovoltaic cells in panel 100 (not shown). The electrical connection is formed between curved portion 636a (which may be spring loaded) and bus ribbon 102. Insertion of upper assembly 600 into lower assembly 218 further provides sealing between upper assembly 600 and lower assembly 218 by gasket 634. Further sealing between upper 600 and lower 218 assemblies is provided by lid 602.

The definite articles "a", "an" is used herein, such as "a terminal", "a junction box" have the meaning of "one or more" that is "one or more terminals s" or "one or more junction boxes".

Although selected embodiments of the present invention have been shown and described, it is to be understood the present invention is not limited to the described embodiments. Instead, it is to be appreciated that changes may be made to these embodiments without departing from the principles and spirit of the invention, the scope of which is defined by the claims and the equivalents thereof.

We claim:

1. A junction box comprising:
    a lower portion including:
        an entry slot to allow entry of an electrical wire attached to a photovoltaic panel into the junction box; and
        a raised protrusion over which the electrical wire is bent and formed to be substantially in the same shape as the raised protrusion.

2. The junction box of claim 1, further comprising:
a clamp attachable to the lower portion, whereby the clamp holds the electrical wire in place for providing an electrical connection.

3. The junction box of claim 1, wherein the lower portion further includes an elastic polymeric element disposed between the raised protrusion and the electrical wire.

4. The junction box of claim 1, wherein the raised protrusion includes an elastic polymeric element.

5. The junction box of claim 1, further comprising:
an upper portion including a terminal, wherein the terminal operatively connects to an electrical load, wherein the terminal is adapted to be applied under pressure onto the electrical wire, thereby conforming the terminal to be of substantially the same shape as the raised protrusion.

6. The junction box of claim 1, wherein the electrical wire is bus ribbon.

7. The junction box of claim 5, wherein the terminal is spring loaded.

8. The junction box of claim 5, wherein the electrical load is selected from the group consisting of: a direct current (DC) to DC converter, a DC to alternating current (AC) inverter, a DC motor and a battery.

9. The junction box of claim 5, wherein the upper portion includes a fastener which closes the upper portion to the lower portion under the pressure.

10. The junction box of claim 5, wherein the upper portion includes a seal between the upper and lower portions, wherein the seal is adapted to seal under the pressure, which effects an electrical connection between the terminal and the electrical wire.

11. The junction box of claim 5, wherein the upper portion includes a diode connected to the terminal.

12. The junction box of claim 11, wherein the diode is selectively either a bypass diode or a blocking diode.

13. The junction box of claim 5, wherein the upper portion includes an electronic module connected to the terminal.

14. The junction box of claim 5, wherein the upper portion includes a cable gland.

15. A method to provide a connection to a photovoltaic panel, the method comprising:
    passing a wire through an entry slot through a lower portion of a junction box;
    bending the wire over a raised protrusion provided in the lower portion of the junction box;
    forming the wire to be substantially the same shape as the raised protrusion; and
    clamping the wire onto the protrusion of the lower portion of the junction box.

16. The method of claim 15 further comprising:
inserting an upper portion of the junction box;
compressively loading, during the inserting, a terminal to the wire; and
conforming the terminal to the shape of the protrusion while electrically connecting to the wire between the terminal and the protrusion.

17. The method of claim 15, further comprising:
inserting an elastic polymeric material between the protrusion and wire.

18. The method of claim 15, wherein the wire electrically connects to the photovoltaic panel.

19. The method of claim 15, wherein during the inserting, sealing the upper portion to the lower portion of the junction box.

20. The method of claim 16, wherein the compressively loading includes spring loading.

* * * * *